(12) United States Patent
Chidambaran et al.

(10) Patent No.: US 11,008,237 B2
(45) Date of Patent: May 18, 2021

(54) METHOD OF TREATING HIGH STRENGTH WASTEWATER BY ANAEROBIC BIO REACTOR

(71) Applicant: Aquatech International, LLC, Canonsburg, PA (US)

(72) Inventors: Ravi Chidambaran, Canonsburg, PA (US); Pavan Raina, Pune (IN); Nitin Chandan, Maharashtra (IN); Sneha Suryakant Chawande, Pune (IN)

(73) Assignee: AQUATECH INTERNATIONAL, LLC, Canonsburg, PA (US)

( * ) Notice: Subject to any disclaimer, the term of this patent is extended or adjusted under 35 U.S.C. 154(b) by 0 days.

(21) Appl. No.: 16/343,537

(22) PCT Filed: Oct. 23, 2017

(86) PCT No.: PCT/US2017/057906
§ 371 (c)(1),
(2) Date: Apr. 19, 2019

(87) PCT Pub. No.: WO2018/076014
PCT Pub. Date: Apr. 26, 2018

(65) Prior Publication Data
US 2019/0263695 A1 Aug. 29, 2019

(30) Foreign Application Priority Data

Oct. 21, 2016 (IN) .............................. 201611036169

(51) Int. Cl.
*C02F 3/28* (2006.01)
*B01D 61/18* (2006.01)
(Continued)

(52) U.S. Cl.
CPC ............ *C02F 3/2853* (2013.01); *B01D 61/18* (2013.01); *B01D 65/02* (2013.01); *B01D 71/024* (2013.01); *C02F 3/005* (2013.01); *H01M 4/96* (2013.01); *H01M 8/16* (2013.01); *B01D 61/14* (2013.01); *B01D 2311/10* (2013.01); *B01D 2311/2688* (2013.01); *B01D 2315/06* (2013.01); *B01D 2315/10* (2013.01); *B01D 2321/04* (2013.01);
(Continued)

(58) Field of Classification Search
CPC .... C02F 3/2853; C02F 3/005; C02F 2303/12; C02F 2303/16; B01D 61/18; B01D 65/02; B01D 71/024; B01D 2311/10; B01D 61/14; B01D 2311/2688; B01D 2315/06; B01D 2315/10; B01D 2321/04; B01D 2321/168; B01D 2321/2041; H01M 4/96; H01M 8/16
USPC .................................. 210/603, 612, 650, 681
See application file for complete search history.

(56) References Cited

U.S. PATENT DOCUMENTS

2006/0175252 A1* 8/2006 Upendrakumar ....... C02F 3/286
210/603

OTHER PUBLICATIONS

Written Opinion (PCT/ISA/237) and International Search Report (PCT/ISA/210) issued in corresponding PCT Patent Application No. PCT/US2017/057906, dated Feb. 8, 2018 (7 pages).
(Continued)

*Primary Examiner* — Fred Prince
(74) *Attorney, Agent, or Firm* — Buchanan Ingersoll & Rooney PC

(57) ABSTRACT

We provide methods, systems, and apparatus for treatment of high chemical oxygen demand wastewater using anaerobic treatment with ceramic membranes. We also provide post-treatment using microbial fuel cells.

13 Claims, 13 Drawing Sheets

Fig.1 A broad typical flow scheme of the process

(51) Int. Cl.
| | |
|---|---|
| *B01D 65/02* | (2006.01) |
| *B01D 71/02* | (2006.01) |
| *C02F 3/00* | (2006.01) |
| *H01M 4/96* | (2006.01) |
| *H01M 8/16* | (2006.01) |
| *B01D 61/14* | (2006.01) |

(52) U.S. Cl.
CPC ............ *B01D 2321/168* (2013.01); *B01D 2321/2041* (2013.01); *C02F 2303/12* (2013.01); *C02F 2303/16* (2013.01)

(56) References Cited

OTHER PUBLICATIONS

Choo et al., Membrane Fouling Mechanism in the Membrane-Coupled Anaerobic Bioreactor, Water Research, 1996, vol. 3, No. 8, pp. 1771-1780.

Zoh et al., Application of a Membrane Bioreactor for Treating Explosives Process Wastewater; Water Research, 2002, vol. 36, No. 4, pp. 1018-1024.

Moen, Anaerobic Digester Foaming: Causes and Solutions; Proceedings of the Water Environment Federation, 2002, pp. 303-310.

Inglesby et al., Enhanced Methane Yields from Anaerobic Digestion of Arthrospira Maxima Biomass in an Advanced Flow-Through Reactor with an Integrated Recirculation Loop Microbial Fuel Cell; Energy & Environmental Science, 2012, vol. 5, pp. 7996-8006.

Lladonosa, Novel Reactor Design as an integral Solution: Microbial Fuel Cell and Wastewater Treatment System, 2014, Department of Environmental and Sustainability Engineering, University of Colorado at Boulder, Jun. 2014, pp. 1-107.

Xiafu Shi et al., "Fouling and cleaning of ultrafiltration membranes: A review", Journal of Water Process Engineering (2014), pp. 121-138.

* cited by examiner

Fig.1 A broad typical flow scheme of the process

Fig.2 Steps of anaerobic diagetion process

Fig.4 Post-tretment of An. MBR effluent by MFC

METHOD OF TREATING HIGH STRENGTH WASTEWATER BY ANAEROBIC BIO REACTOR

CROSS-REFERENCE TO RELATED APPLICATIONS

This application claims priority to Indian Patent Application No. 201611036169, filed on Oct. 21, 2016. That application is incorporated by reference herein.

BACKGROUND OF THE INVENTION

Field of the Invention

Embodiments relate to the treatment of high strength wastewater by anaerobic processing. Ceramic membranes are also incorporated into the treatment.

Background of the Related Art

Anaerobic treatment has been used for treatment of concentrated industrial wastewater as well as domestic waste water (See "Comparisons between the UASB and the EGSB Reactor," Seung J. Lim). Jewel (1987) reported that the septic tank was the simplest, the oldest and most widely used process.

Anaerobic treatment is an energy generating process, in contrast to the aerobic systems that generally demands high-energy inputs for aeration purpose. It is relatively simple and inexpensive technology that consumes less energy, space and produces less excess sludge in comparison to conventional aerobic technologies. Net energy production from biogas makes anaerobic treatment technology an attractive option over other treatment methods. (See Anaerobic Treatment of Industrial Effluents: An Overview of Applications. Mustafa Evren Ersahin, Hale Ozgun, Recep Kaan Dereli and Izzet Ozturk.)

The success of anaerobic wastewater treatment can be attributed to an efficient uncoupling of the solid retention time from the hydraulic retention time through biomass immobilization. This is usually accomplished through biofilm or granulation. The separation of biomass from the effluent, using membrane technology, is another attractive method to retain the biomass within the anaerobic recator. (See Developments and future potentials of anaerobic membrane bioreactors (AnMBRs), Chettiyappan Visvanathan and Amila Abeynayaka.)

Anaerobic membrane bioreactors ("An. MBR") offer high quality effluent free of solids and pathogens due to their superior treatment efficiency with complete retention of biomass, regardless of their settling and granulation properties. Further, anaerobic MBR can be used to retain special microbial communities that can degrade specific pollutants in the wastewater. Therefore this technology presents an alternative option for treating industrial wastewater and/or slurries of extreme condition such as high salinity, high temperature and high concentration of suspended solids. An. MBR is differentiated based on the operation of membrane module. The membrane may be operated under pressure or it may be operated under vacuum.

Though An. MBR is may generate high quality and consistent product, certain issues associated with the operation have not been resolved. These include, for example, fouling of membrane, limitation of polymeric membranes, operation at high temperature especially in thermophilic range, sensitivity of polymeric membranes to certain oxidizing agents or biological activities, limitation of membrane to handle aggressive chemical cleaning and mechanical properties to deal with high concentration of organic or inorganic suspended solids.

BRIEF DESCRIPTION OF THE INVENTION

There is a need for a process, which can address membrane related issues and make robust system for its wide application with different types of wastewater. There is also a need for post treatment or polisher as a part of anaerobic process so that the treated water product is within the discharge norms with a low operating cost. Embodiments of the invention as reported herein may, but are not required to, overcome one or more of these disadvantages. They may also, but again are not required to, achieve one or more of the objectives reported below.

These objectives include, for example:
1. To develop an An. MBR process for treatment of different types of wastewater.
2. To devise an An. MBR process which can be operated at wide range of temperatures within mesophilic and thermophilic conditions. This process water should be able to treat high temperature water without cooling.
3. To come up with integrated of anaerobic process with high performance membranes that can be operated at wide application range of temperature and pH.
4. To define mass balance of anaerobic process at its different stages. To come up with a high efficient mixing system that can generate highly reactive sludge in a finely divided form but still not foul the membrane.
5. To devise a post-treatment process or processes for the anaerobic process along with a potential for additional energy generation.

Embodiments provide methods and apparatuses for biological anaerobic treatment of high strength wastewater. Embodiments include at least one continuously stirred anaerobic reactor which can be operated at either mesophilic or thermophilic range of biological conditions. Embodiments may also provide integration of an externally operated ceramic membrane module for separation of sludge and water.

An anaerobic reactor was tested at with different types of wastewater to develop a biological process and operating parameters. We also provide conditions for operation of ceramic membrane to filter anaerobic mixed liquor. Embodiments may present mass balance and data generation of methanogenic activity at different reactor conditions. Embodiments may be useful with different types of wastewater. These include, for example, those coming from sugars, dairy and brewery industries.

Embodiments may provide as much as 98% Chemical Oxygen Demand (COD) reduction in anaerobic MBR. A high percentage of methanogenesis has been observed with an average 0.3 m$^3$/Kg·COD gas generations. The system was operated COD loading in the range of 1 to 20 Kg·COD/m$^3$·day and more specifically between 3 to 15 Kg·COD/m$^3$·day. A reactor was operated in temperature range from 30 to 70° C. and more specifically between 35 to 57° C. The externally operated ceramic membrane was operated at cross flow mode. The hydraulic flux from membrane module was 3 to 50 lmh and more specifically between 5 to 30 lmh.

The ceramic membrane demonstrated good tolerance at high temperature operation and tolerated variable pH conditions during cleaning. It also provided good mechanical strength to operate at high Trans Membrane Pressure (TMP). The thermophilic process has shown improved biogas generation as compare to mesophilic. The mass balance data showed methanogenesis in the range of 50 to 90% for mesophilic range and up to 94% for thermophilic range.

Embodiments also provides a method for posttreatment of anaerobic product water with microbial fuel cell in a closed loop for polishing anaerobic MBR product water for further reduction of COD. Typical flow scheme for the process is as shown in FIG. 1.

The main advantages of this process can be summarized as follows—
1. An integrated Anaerobic process which combines highly efficient aneaerobic reactor delivering high COD treatment for high strength waste water with almost quantitative methane gas yields combined with a robust and non fouling membrane system.
2. A uniquely designed hydraulic mixer which makes sure that reactor is kept continuously mixed even at high MLSS concentration while maintain the sludge to provide a highly reactive environment and adjusting the particle size such that it remains non fouling for membranes and leakage through the membranes remains negligible.
3. A process which is flexible to operate in a wide range of temperatures without ant change to the basic design.
4. A robust membrane system design which provides order of magnitude higher flux as compared to polymeric membranes, can withstand high temperature process operation and still remain fouling resistant and can be cleaned with aggressive chemical cleaning compounds including oxidizing agents.
5. Integration with a unique post treatment which is easy to operate, delivers product without adding any suspended solid contamination and has the potential to deliver additional energy from the process.

DETAILED DESCRIPTION OF THE PRESENT INVENTION

Figure 1:
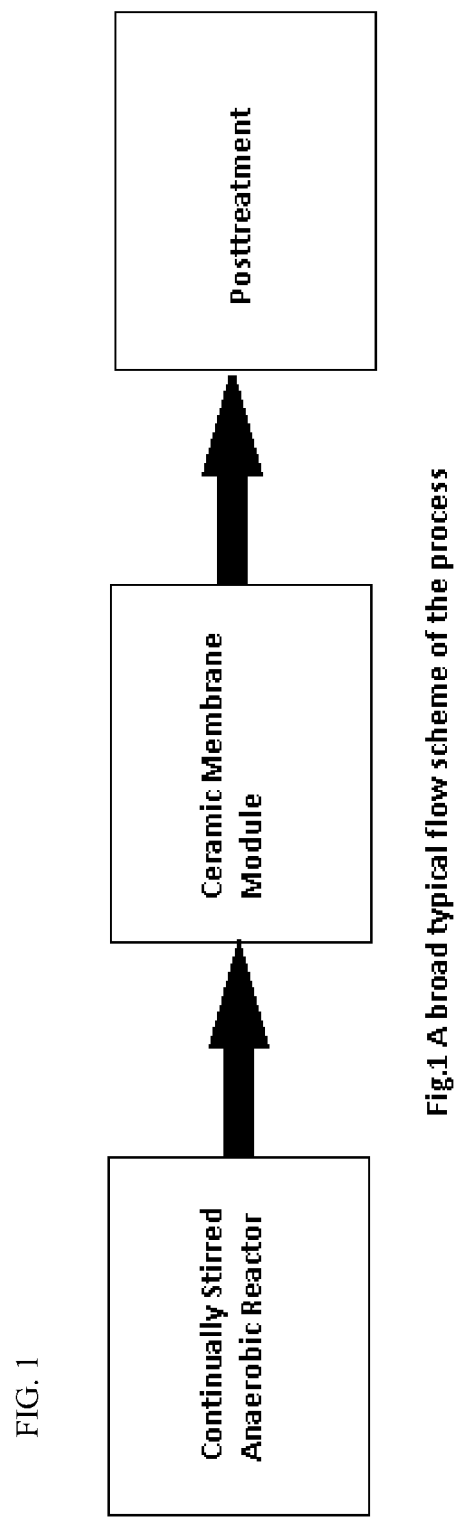
FIG. 1 shows a typical flow scheme of a process as reported herein.
Figure 2:
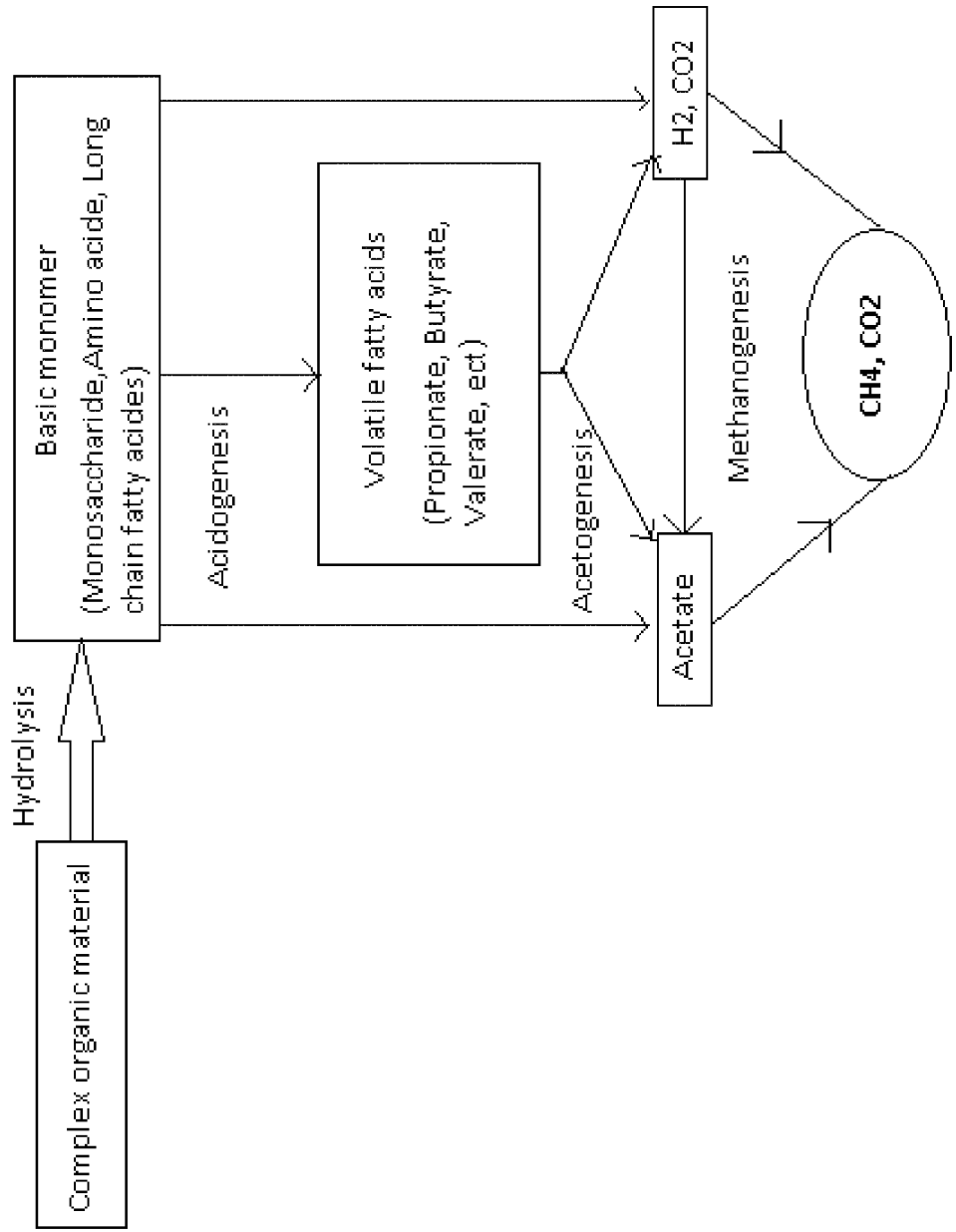
FIG. 2 shows a metabolic pathway of anaerobic digestion.

An anaerobic process is a complex multistep process in terms of chemistry and microbiology. Organic material is degraded to basic constituents, finally to methane gas under the absence of an electron acceptor such as oxygen. The basic metabolic pathway of anaerobic digestion is shown in FIG. 2.

The anaerobic digestion focuses on three steps:
a. Hydrolysis
b. Acid formation
c. Methanogenesis The two rate limiting steps in anaerobic digestion are hydrolysis and methanogenesis. The rate-limiting step in anaerobic degradation depends upon nature or complexity of wastewater that undergoes treatment. The rate of hydrolysis is the function of pH, temperature, concentration of hydrolyzing biomass and type of particulate organic matter. Different group of bacteria such as fermentative acetognes, homoacetogenes, hydrogenetropic methanogen and aceticlastic methanogen carry out the anaerobic degradation of complex organic. The anaerobic microorganism, especially methanogens, are highly sensitive to environmental changes. Methanogens are highly susceptible to substrate loading as well. The optimum pH for acetognes/acidogen are 5.5-7.2 and methanogens are 6.8-7.8.

The anaerobic treatment can be done in low rate anaerobic reactors such as anaerobic ponds or septic tanks. The high rate anaerobic treatment can be further classified as either a suspended growth or an attached growth process. Anaerobic digesters, continuous stirring tank reactors (CSTRs), upflow anaerobic sludge blankets (UASBs) and An. MBRs are some of the suspended growth processes.

In the anaerobic process an anaerobic microbial system discards the electron into methane instead of using them to grow more microorganisms due to the absence of oxygen as an electron acceptor. This leads to low biomass production where less biomass production is an advantage for reduced sludge treatment cost. However, it is difficult to maintain the population of slow growing methanogens within the reactor. Retention of sufficient biomass in the reactor is a critical factor for successful operation of an anaerobic process.

Many technological developments in granular sludge and microbial biofilm that retain cells in the reactor have been made to maintain the higher biomass. An anaerobic granular sludge process like UASB has proven to be useful. However, various industrial wastewaters characteristics impact negatively in the sludge granulation process or even lead to degranulation and loss of biomass. High suspended solids (SS), high temperature, fat, oil and grease (FOG) content, toxicity, high salinity, drastic changes in organic loading rate (OLR) and significant HRT fluctuations can be given as examples of extreme situation and have negative impact on the performance of the anaerobic reactors.

An. MBR process developed in the present invention may overcome the above mentioned shortcomings by providing process stability and also generates high quality product. It also offers various advantages as an integrated process combined with a membrane system.

The polymeric membrane applied in filtration of anaerobic sludge is a challenge as highly fine suspended sludge can quickly foul the membranes. In case membranes are used in submersible condition frequent membrane cleaning is required and maintaining its productivity could be a difficult task. The membranes may require high chemical cleaning frequency which affects the membrane life and total productivity from the system.

The present invention uses a ceramic membrane system to filter sludge with water in an external configuration. The ceramic membranes are resistant to high temperatures up to 85° C. and also resistant to fouling due to cross flow velocities. They can be cleaned with aggressive chemical cleaning conditions.

The ceramic membranes are robust. It can work continuously for long periods of operation delivering high flux; flux may b 3-10 times higher compared to polymeric membranes. The process developed in present invention uses less chemical cleaning.

Ceramic membranes of different types and configuration can be used for this process. The ceramic membrane used in embodiments can tolerate cleaning pH of 1-14 range and temperature up to 110° C. and 85° C. for continuous operation. The membrane has a well distributed and controlled pore size of 0.05µ. The membrane can withstand 60 psi operating pressure and Membrane operate in inside-out mode or outside in mode depending on its construction. The tube diameter of ceramic membrane in one embodiment is 3.6 mm, which can handle highly viscous fluid. In other embodiments the tube diameter is between 3 and 4 mm.

Although the ceramic membranes can be used in both submerged and side stream operation, the membranes used in the present invention operate in a side stream configuration that provides several operational advantages. These include, for example, compactness of the system, accessibility of the membrane and easy removal or opening of module during maintenance. Chemical cleaning is easier as filtration unit can be isolated from biological process. Preservation and storage of during non-operation time or long shut down is straightforward.

Figure 3:
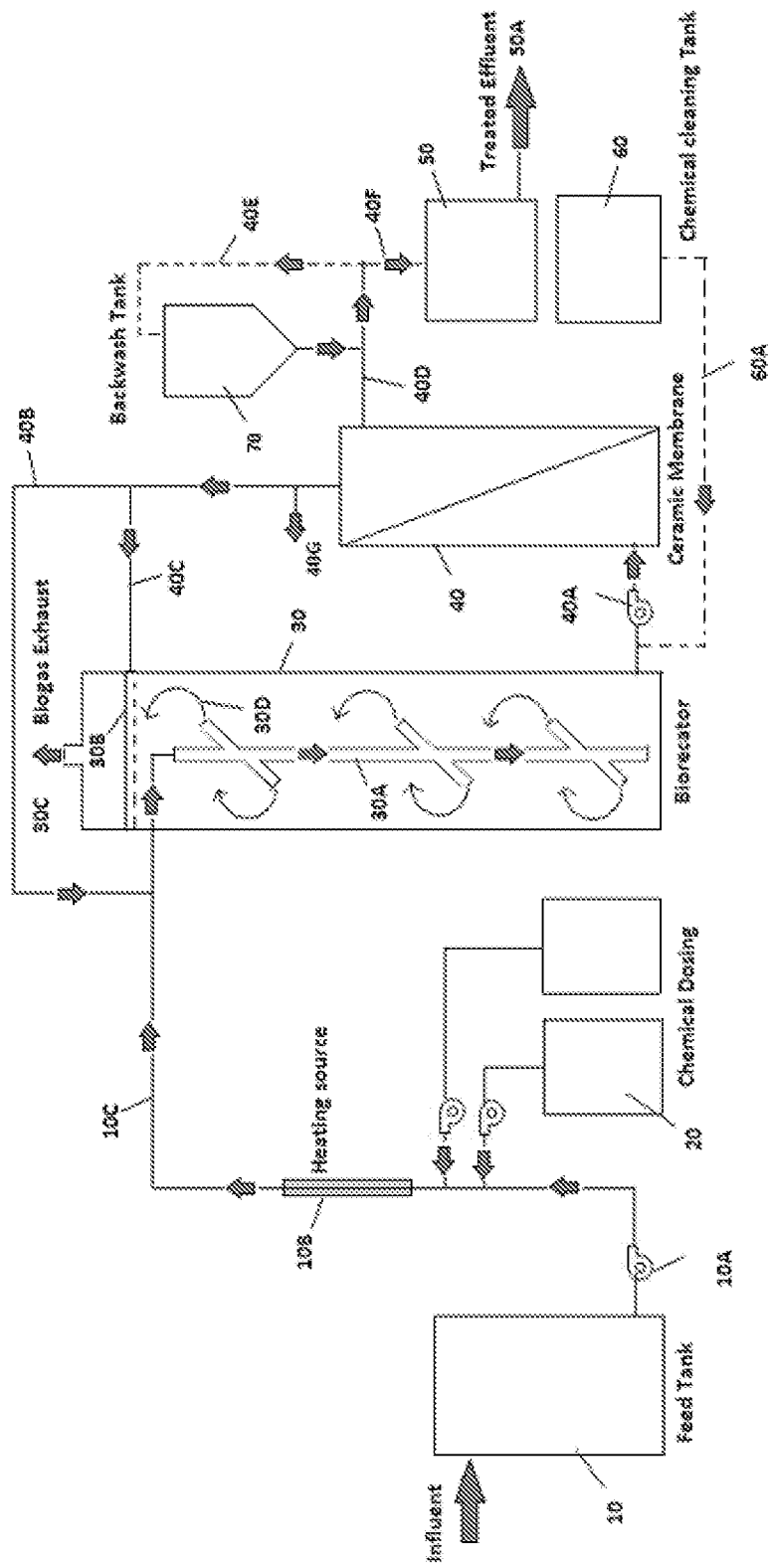
FIG. 3 shows a detailed flow chart of embodiments of the invention.

A detailed flow scheme of a process according to embodiments is shown in FIG. 3.

With reference to FIG. 3, we present an anaerobic membrane bioreactor which is also termed as An.MBR. This includes a compact purification system that combines bioreactor and membrane separation system. The process described herein is capable of treatment of high strength wastewater which constitutes biodegradable carbon. The anaerobic system comprises an bioreactor, membrane unit, backwash tank and membrane cleaning unit. The system combines multiple processes and operations, which result in chemical conversion of biodegradable carbon into carbon dioxide/methane and physical separation of sludge and water.

The system operation starts with Feed tank 10, which could be an equalization tank where water coming from different streams are combined and stored. It provides a consistent feed stock to the biological process. Pump 10A takes water to the biological reactor from feed tank 10. This is a sludge water pump having capacity to handle highly suspended finely solid sludge. Dosing system 20 is provided to supply pH balance and micronutrient balance in biological reactor. Heating system 10B is provided to maintain the feed water temperature of the biological system.

In one of the embodiments of the present invention a mesophilic process was studied with three to four type of different wastewater, and in another embodiment a thermophilic process was studied. Heating source 10B controls temperature of feed water from 35° C. to 60° C. If the feed water is supplied hot there may not be any need to heat the water. The heating system is used to maintain the temperature.

Line 10C provides feed water to the biological reactor 30. Line 10C is insulated to avoid loss of temperature before water enters to the biological process. Biological reactor 30 is a mixed biological reactor and it is also insulated to control temperature of reaction mixture. The constituents in wastewater are decomposed in biological reactor 30. The biodegradable carbon in wastewater is converted to carbon dioxide and methane while nitrogen present in the form of organic nitrogen gets converted to ammonical nitrogen. Before conversion to the final product the biodegradable constituents in wastewater go through different steps. They first break down to small chain compounds from long chain in a hydrolysis step. Further small chain compounds are converted to the acetates and finally to methane, carbon dioxide and ammonia in the fermentation step.

Biological reactor 30 is a mixed reactor which makes homogeneous mixture of the sludge water. It comprises two main components, a hydraulic mixture 30A and a diffuser 30B. The biological reactor also includes an opening 30C at the top for exhaust of biogas generated after degradation of biodegradable carbon compounds. The preheated feed water from line 10C enters the the hydraulic mixer 30A. The hydraulic mixer 30A is designed uniquely in such a way that when water exits the hydraulic mixer it exits with certain velocity which creates motion of the fluid in that area.

Velocity difference is created in hydraulic mixer 30A which helps to create motion of the liquid. Nozzles 30D of specific sizes are provided through out the length of the mixer. The distance between two nozzles is 200 to 1200 m and more specifically 300 to 800 mm. These nozzles 30D are provided on the circumference of center pipe of hydraulic mixer 30A. Angle of 60° is maintained while designing the position of nozzle so that it will cover length of upper and bottom portion for mixing. The efficiency of the hydraulic mixer is dependent on the exit velocity through the design nozzle. The velocity of water at the internal pipe and also velocity of water when it exits from the nozzle 30D provides the mixing in the reactor.

A relation in between both the velocity has been derived based on dimension less analysis. (Froude number and Reynolds number). The velocity of fluid in central pipe is from 0.3 to 2.5 m/sec and more specifically it is 0.4 to 1.6 m/sec. When fluid exit nozzle 30D its velocity increases to 3 to 14 m/sec. When fluid exits the nozzle, it creates circular motion at different length of the hydraulic mixer which keeps the total fluid in reactor in mixed condition. The biological reactor 30 also includes a diffuser 30B which is provided for flushing the the top of the biological reactor. Diffuser 30D is having holes of size 1 to 12 mm and more specifically from 3 to 8 mm. It distributes the mixed liquor received from line 40C. Role of distributor 30B is to control foaming within biological reactor by flushing from top. It helps to reduce and/or remove the foam formed within reactor to maintain steady condition.

Embodiments include a ceramic membrane module 40 for separation of sludge and water. The biological reaction mixture after degradation of biodegradable component enters to the membrane module by pumping through membrane feed pump 40A. Ceramic membrane used in present invention is a side stream inside out tubular membrane. The membrane module constitutes a number of ceramic channels potted from both ends. The biological reaction mixture enters the membrane module from inside under 1-5 Kg/cm$^2$ pressure and water gets separated from sludge through pores of the module. The ceramic membrane can be a microfiltration or ultrafiltration membrane, for example.

In one of the embodiment ultrafiltration grade ceramic membrane is used, having pore size of 0.01 to 0.05 microns. Ceramic membrane can be placed vertically or horizontally outside the biological reactor. The membrane modules can be arranged vertically one above the other to take advantage of lower footprint and reduce total cross flow required for operation. The module can also be arranged horizontally in series if required.

In an embodiment of the present invention ceramic membrane module 40 is placed in a vertical position. It is operated in cross flow mode. Cross flow velocity for operation is in between 0.5 to 5.0 m/sec and more specifically from 1.5 to 4.0 m/sec. Ceramic membrane separates sludge and water. Ceramic membrane module operates at flux from 5 to 200 lmh and more specifically from 15 to 100 lmh. The permeate water comes out of the membrane module 40 through line 40D. The cross circulating stream of the ceramic membrane is divided into two parts. One part is recirculated in biological reactor 30 through line 40C. The line 40C is connected to the diffuser 30B. Other part of the cross circulating stream from the membrane module is also recirculated to the biological reactor through the line 40B. Line 40B connects with the line 10C which then commonly enters to the hydraulic diffuser 30A.

The permeate from membrane module 40 is divided in two parts one part goes to the treated effluent tank 50 through line 40F while the other part is connected to the backwash tank 70 through line 40E. The backwash tank is provided for intermediate physical cleaning of the ceramic membrane at high pressure for few seconds. It helps to remove the thin sludge layer formed over the membrane surface. It also reduces frequency of chemical cleaning. Another advantage of using ceramic membrane in the An. MBR system is that it requires few seconds for backwash or back pulse, and less water quantity is required which increases overall system recovery. The treated effluent goes out with line 50A. It further enters the post treatment step, which is described in another embodiment of the present invention. The chemical cleaning tank 60 provides chemicals through line 60A for periodic cleaning of the ceramic membrane module 40. The chemical cleaning is required only when membrane flux drops due to fouling and not recovered by back-diffusion or back pulsing. Various chemicals like sodium hypochlorite, sodium hydroxide, citric acid, hydrochloric acid are used for cleaning purpose depending on the degree of fouling by passing the solution through the membrane module with pump 40A. The Chemicals are re-circulated for 5 to 60 min and socked for 0.5 to 12 hours in basic and acidic condition. The advantage of ceramic membrane is that it can withstand chemical pH from 2 to 11. Line 40G is provided for recirculation of chemical in the membrane module.

Embodiments provide methods for post-treatment of treated effluent from An. MBR system. Generally an aerobic process is mostly applied in post treatment as required. In embodiments of the present invention microbial a fuel cell is applied for further removal of soluble COD from treated effluent of An. MBR. The advantage of using microbial fuel cell (MFC) is that it works on both anaerobic and aerobic condition. As the treated effluent of anaerobic process is already free from oxygen and also contains soluble COD so ready for an anaerobic reaction for MFC operation. The objective of using MFC is to reduce soluble COD from treated effluent of the anaerobic MBR and reduce its COD up to the dischargeable limit or for reuse without any addition of suspended solids.

Figure 4:
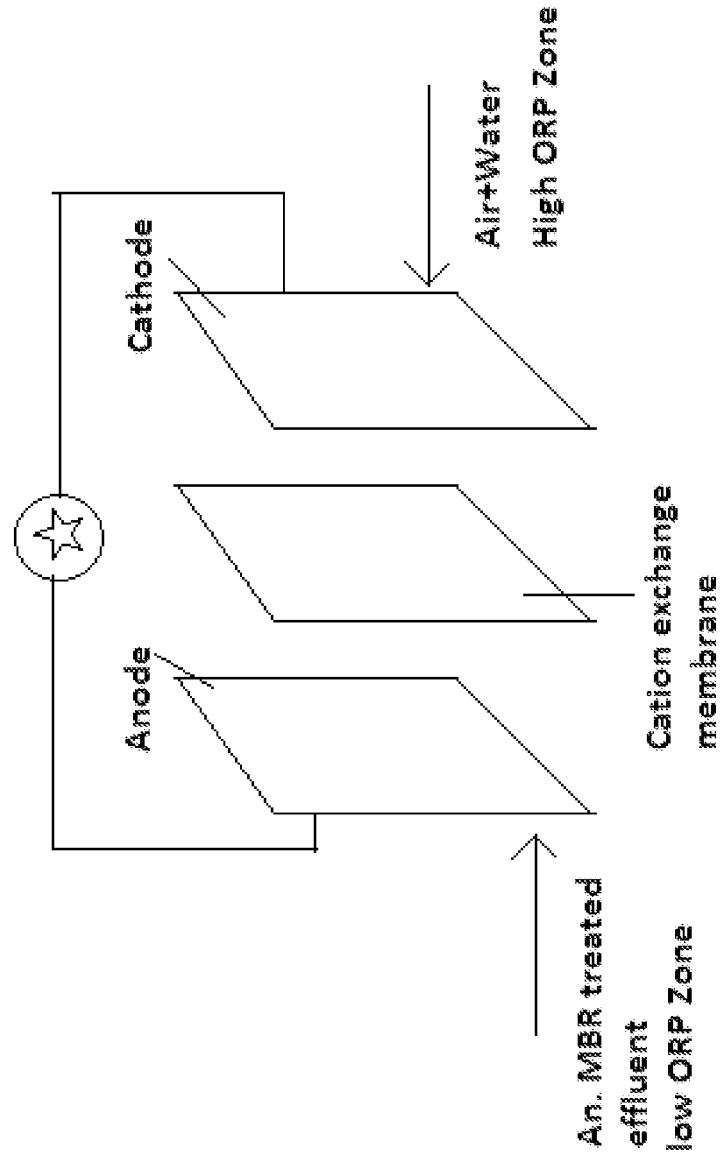
FIG. 4 shows a conceptual flow scheme for the post-treatment method of the present invention.

FIG. 4 shows a conceptual flow scheme for the post-treatment method of the present invention. In a basic MFC cell two electrodes and one Cation exchange membrane are used. Various types of electrode materials like stainless steel, titanium, carbon, carbon brush, carbon rod can be used. An embodiment of the present invention used graphite plate as electrode material. The graphite material is highly conducting, cost effective and can be operated with high current density and offers relatively low electrical resistance. Out of two electrodes used in MFC one is acting as anode and another is acting as cathode. The electrodes are separated by heterogeneous cation exchange membrane. The cation exchange membrane used in present invention is heterogeneous cation exchange membrane which allows positive ion to pass through it. One cell of MFC consists of an anode, a cation exchange membrane and a cathode. Multiple cells MFC can be made from 1 cell to 10 cell.

In an embodiment of the present invention a 4 cell MFC stack was used for treatment of An. MBR effluent. In MFC An. MBR treated effluent having low ORP passes through anode chamber while high ORP oxygen rich water passes in cathode chamber. The residual COD of low ORP zone water starts to get degraded in the anode chamber with anaerobic bacteria film on the anode surface, while degradation it generates electron, carbon di-oxide, water and hydrogen ion. Electron generated is attracted by anode electrode and hydrogen ion generated is transported through ion selective cation exchange membrane.

Through cation exchange membrane it enters to cathode chamber where it comes in contact with oxygen to form water molecule. The electron generated in anode chamber completes the circuit and generates a potential difference. This potential difference is nothing but the electricity generated. While treatment of residual COD from An. MBR effluent, MFC does not need any extra energy like it is required in aerobic process, and in turn produces energy in this novel posttreatment step.

In present invention MFC unit was operated at HRT of 0.5 to 20 hours and more specifically 2 to 12 hours for degradation of residual COD. MFC unit reduced COD by average 50-70% and bought effluent water in the discharge limit. While degradation of organic compound was observed to generate voltage up to 1.5 to 2.0 V. Power generations through the MFC module was 3.3 mW/m$^3$.

Case Studies with Reference to the Present Invention

A number of experiments were performed to verify and validate the results of this invention described above. Anaerobic process was studied in both Mesophilic and Thermophilic temperature range. In mesophilic range reactor was studied at 37+/−1° C. of temperature while at thermophilic range temperature was increased to 57+/−1° C. Different types of water conditions were used like glucose, dairy water and brewery water to understand the reactor as well as membrane performance.

Example-1

Study with Glucose Water

In this part of the study reactor was run with simulated water having glucose as contributor of COD and BOD and other constituent for alkalinity, TDS and macro/micro nutrient balance. The System was run as per the flow scheme shown in FIG. 3. This was the initial phase of study so reactor was operated at low organic loading by controlling flux through the membrane. Initially reactor was operated at 5000 mg/lit feed COD and then gradually this COD is increased to 15000 mg/lit. With increasing feed COD there was gradual increase in reactor HRT. Gradually HRT of reactor was increased to 70 hours from 32 hours initially. This was done to maintain organic loading of the reactor and avoid shock loading during start up time. With increase of COD there was increase in MLSS also and it increased to 25000 mg/lit at the feed COD of 14000 mg/lit. During the trial COD loading of the reactor was in the range of 3.4 to 4.2 Kg/m$^3$·day.

TABLE 1

| HRT hrs | MLSS Mg/lit | Feed COD Mg/lit | COD Reduction % |
|---|---|---|---|
| 32 | 11700 | 5200 | 91.45 |
| 39 | 13000 | 7800 | 91.00 |
| 47 | 19300 | 9300 | 97.00 |
| 58 | 19000 | 11000 | 98.30 |
| 70 | 25500 | 14000 | 99.11 |

As shown in Table 1, COD reduction is maintained/improved with increase of the COD. This study was extended for the next phase in which organic loading of anaerobic reactor was increased to 10 Kg/m$^3$·day. The feed COD was kept in the range of 15000 mg/lit and membrane flux was increased. HRT of reactor decreased from 70 to 40 hours with increase of flux.

TABLE 2

| HRT hrs | MLSS Mg/lit | Feed COD Mg/lit | COD Reduction % | COD loading Kg/m3 · day |
|---|---|---|---|---|
| 70 | 25500 | 14000 | 99.1 | 3.30 |
| 65 | 28700 | 14300 | 98.6 | 4.62 |
| 61 | 27800 | 14300 | 98.8 | 4.92 |
| 55 | 26600 | 13200 | 98.0 | 5.00 |
| 50 | 23000 | 15700 | 97.0 | 6.59 |
| 45 | 22400 | 15600 | 99.0 | 6.24 |
| 40 | 23400 | 15000 | 98.0 | 9.00 |

Figure 5:
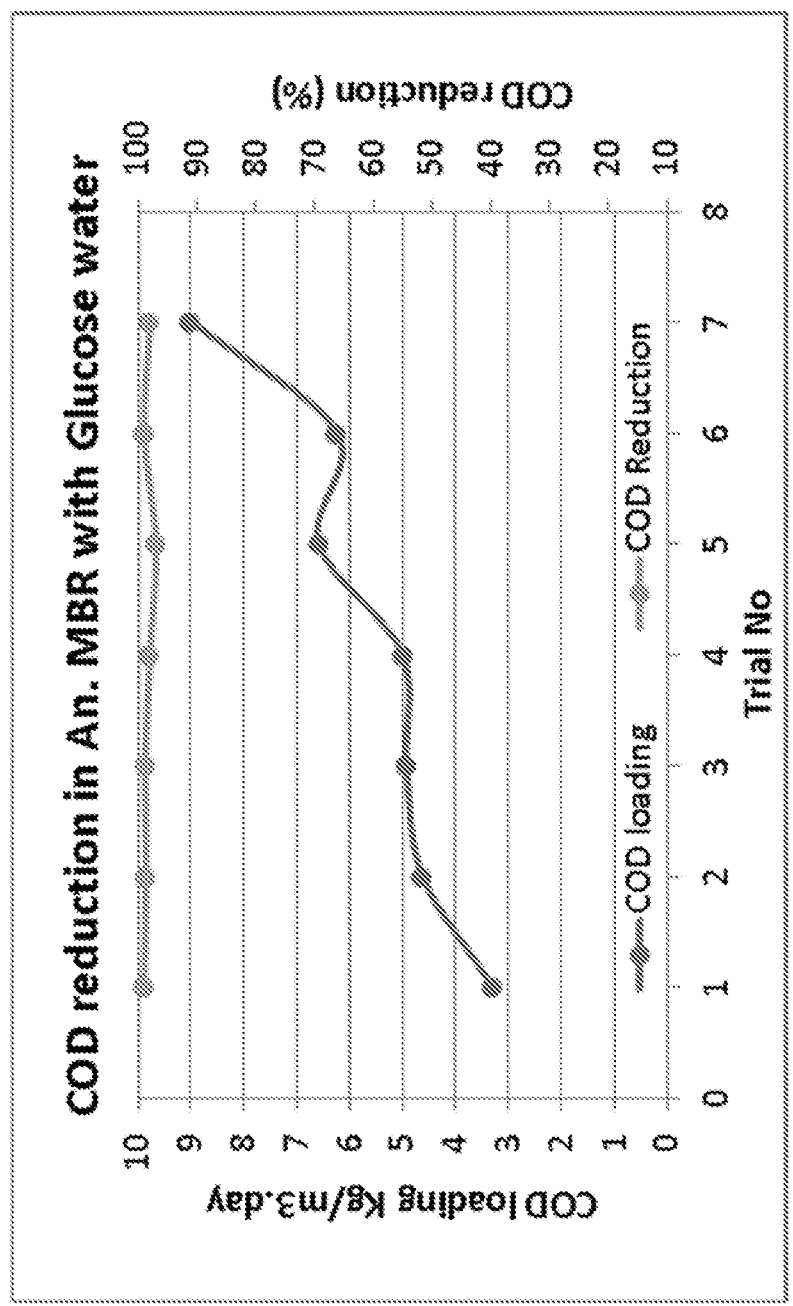
FIG. 5 shows COD reduction in Example 1.

As shown in Table-2 and FIG. 5, COD reduction from the system is maintained throughout the trial. Ceramic membrane system operation during this case study with glucose wastewater was done at 8-20 lmh flux. Average outlet turbidity of membrane module was <5.0 NTU. This indicates rejection of all solid sludge by the membrane. No loss of sludge during operation. So anaerobic reactor can retain more MLSS and can be operated high COD loading. During the trial mass balance study was done in terms of COD reduction and methane generation. More than 90% and more specifically 95% Methanogenesis observed in all the steps and methane gas generation was 0.33 m$^3$/Kg COD.

Figure 6:
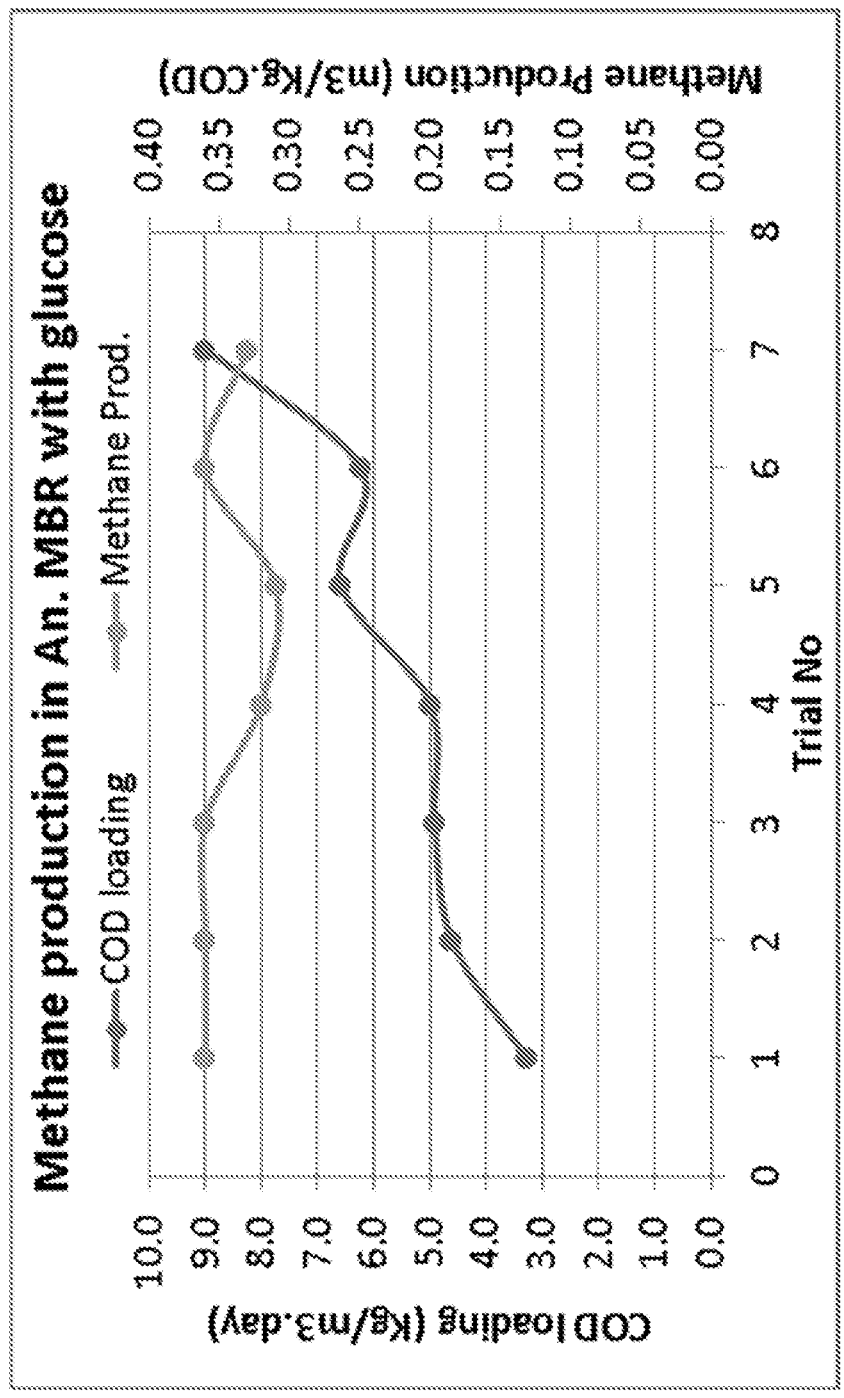
FIG. 6 shows methane gas production as maintained at COD loading conditions in Example 1, below.

As shown in FIG. 6 Methane gas production is maintained at all the COD loading conditions. Mass balance is tabulated in Table-3.

TABLE 3

| Parameters | Unit | Value |
|---|---|---|
| Average gas generation per Kg of COD | M$^3$/Kg/day | 0.33 |
| % Hydrolysis | % | 92.77 |
| % Acidification | % | 97.00 |
| % Methanogenesis | % | 95.00 |

Example-2

Study with Dairy Wastewater

Study of dairy wastewater was conducted with the similar flow scheme as shown in FIG. 3. Reactor temperature was kept at 37° C., which is in the mesophilic range. Simulated water having dairy wastewater was used as feed. Micronutrients were added to the feed water. Composition of the wastewater is shown in Table 4.

TABLE 4 composition of dairy wastewater

| Component | % Contribution |
|---|---|
| Carbohydrates | 52.3 |
| Proteins | 6.6 |
| Sugar | 34.9 |
| Fat | 6.2 |

Figure 7:
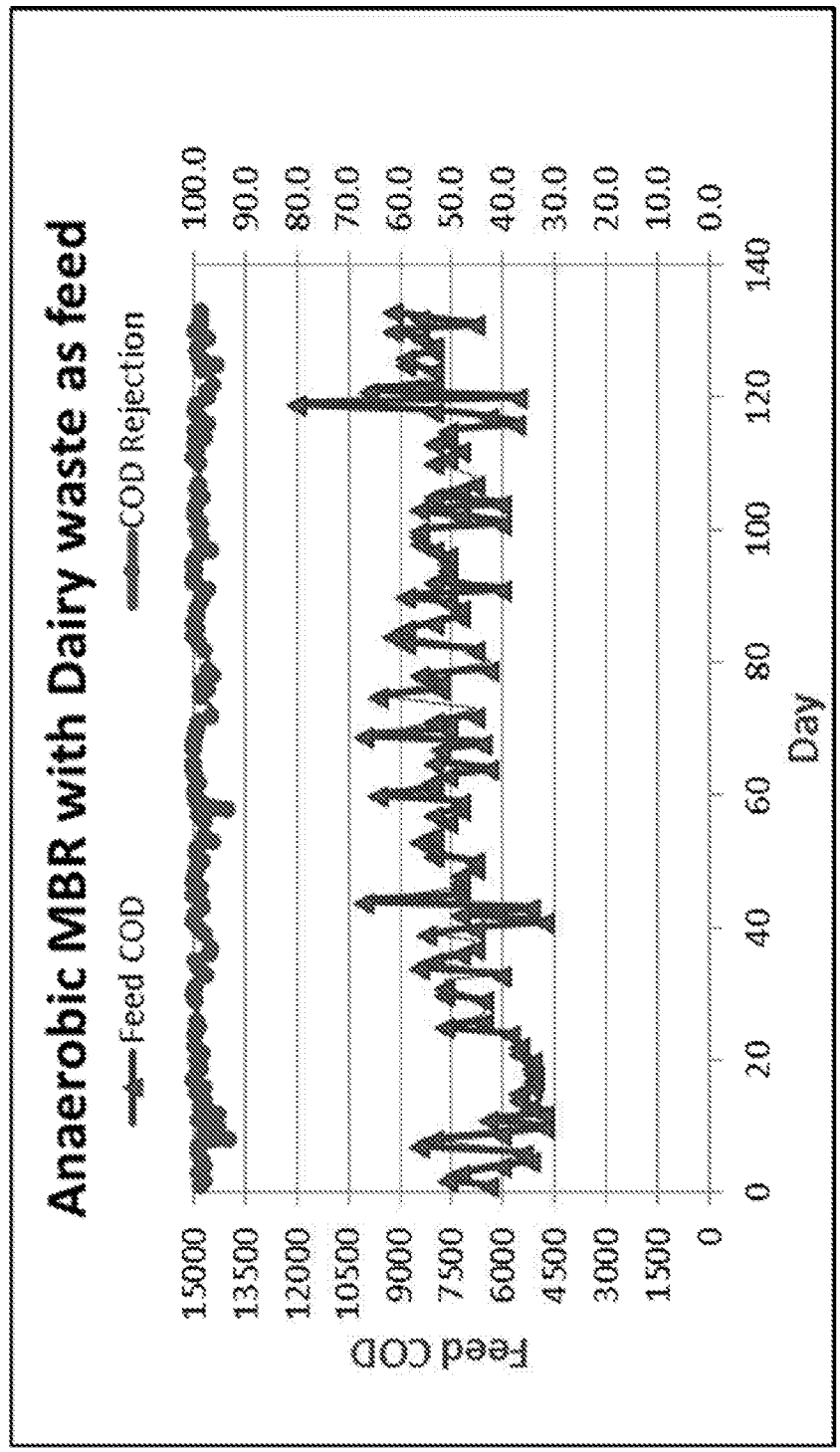
FIG. 7 shows stable reactor performance and COD reduction at 98% in Example 2.
Figure 8:
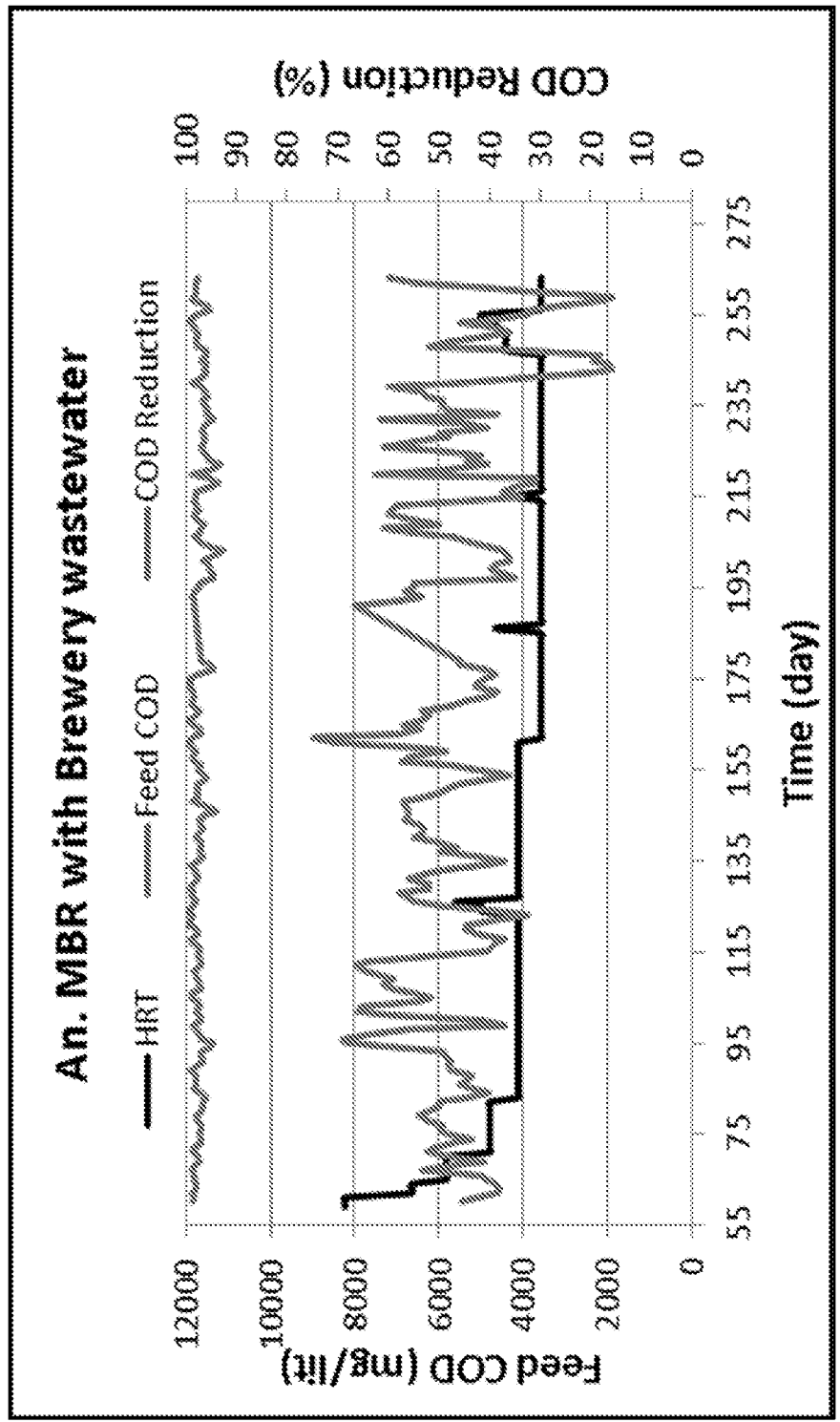
FIG. 8 shows COD results of Example 3.

With dairy wastewater, system was operated for 123 days continuously. Stable reactor performance has been observed and COD reduction was maintained at 98% as shown FIG. 7.

Mass balance for dairy wastewater was done to understand the progress in terms of hydrolysis, acidification and Methanogenesis.

Details are tabulated in Table 5.

TABLE 5

| Parameters | Unit | Value |
|---|---|---|
| Average gas generation per Kg of COD | M$^3$/Kg/day | 0.26 |
| % Hydrolysis | % | 68.00 |
| % Acidification | % | 72.84 |
| % Methanogenesis | % | 67.76 |

Gas generation in case of dairy waste trial is observed to be less as compare to glucose water which might be due to presence of high molecular weight compounds. The first step hydrolysis percentage is also less when reactor was operated at same HRT condition. Average 67% Methanogenesis is observed in this case.

Example-3

Study with Brewery Wastewater

This process was studied with simulated brewery wastewater having 6000-ppm average feed COD. During acclimatization phase the reactor was fed with simulated wastewater. Same flow scheme was followed as shown in FIG. 3. It took almost 50 days to achieve 98% COD reduction from the system after changing feed water character. Composition of feed water is shown in

TABLE 6

| Name | Conc, ppm | Solution |
|---|---|---|
| Ammonium Sulphate | 11 | Nitrogen source |
| Disodium hydrogen phosphate | 140 | Phosphate source &buffer |
| Ethanol | 3.54 | C-source |
| Malt extract | 1000 | C-source |
| Maltose | 860 | C-source |
| Peptone | 150 | C-source |
| Yeast extract | 500 | C-source |

For the initial few days the reactor was operated at HRT of 70 hours to stabilize the system and after that HRT was gradually reduced to 30 hours. Then operated at 30 hours HRT and 5 Kg COD loading. At this condition reactor shows 98% COD reduction. COD reduction was observed to be maintained during continuous trial of 100 days.

Figure 9:
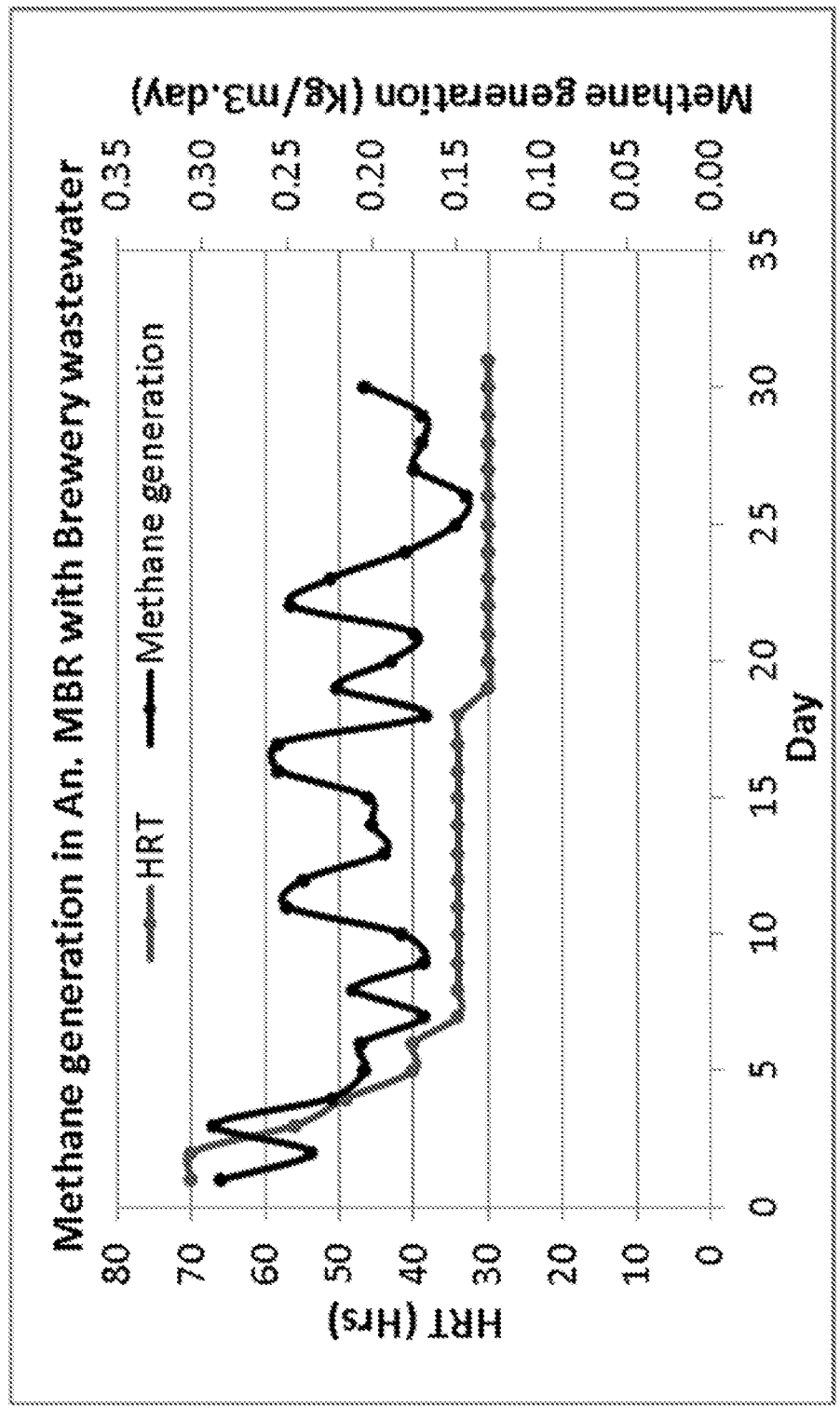
FIG. 9 shows methane generation data for Example 3.

Mass balance study for this trial was also done which shows that methane gas production rate is 0.21 m$^3$/kg. COD at 30 hours HRT while it increases to 0.27 m$^3$/Kg. COD at 70 hours HRT. At higher hydraulic retention time conversion of COD to methane is more. FIG. 9 demonstrates data related to methane gas generation.

Example-4

In present invention the first three examples were operated in mesophilic range by controlling reactor temperature at 37° C. In all cases COD reduction from anaerobic reactor is observed to be maintained more than 95% at various COD loading and HRT conditions. It is also seen that there is variation in methane gas production. When operated with simple glucose wastewater it shows high methane conversion rate and gas production observed to close to the theoretical one. But in case of dairy and brewery wastewater gas production rate decreases by 21% and 40% respectively. It is observed that the conversion rate in mesophilic condition becomes slower as moved to the more complex water.

Figure 10A:
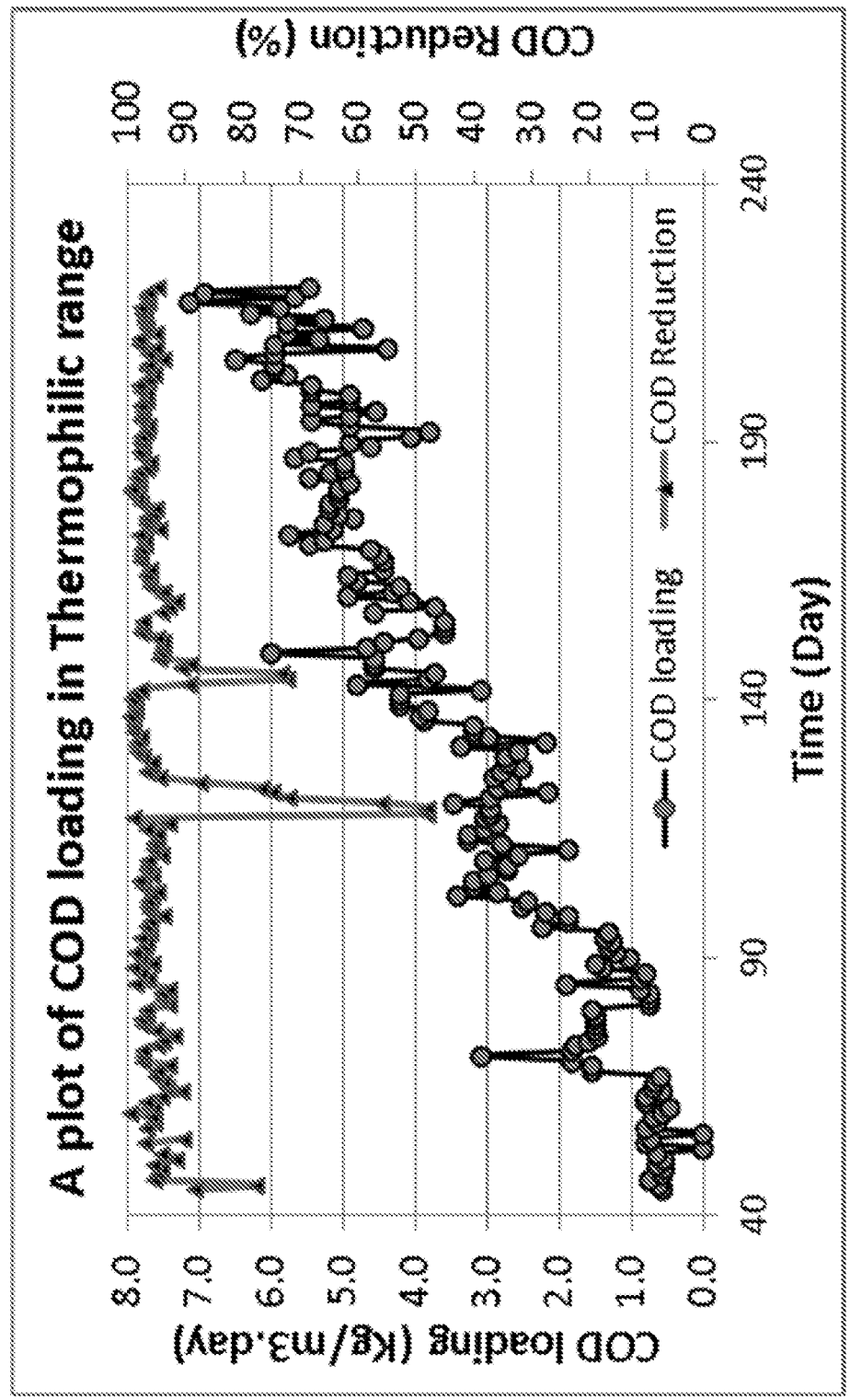
FIG. 10A shows increase of COD loading in Example 4.

So another embodiment of the present invention describes the system operation at thermophilic condition that is at 57° C. reactor temperature. The system was operated with brewery wastewater. Same flow scheme as shown in FIG. 3 was applied for this trial also. The An. reactor temperature was gradually increased to reach at thermophilic range. Some process parameters also altered to stabilize the system. Initially COD reduction was dropped to 20% but with increase of HRT to 90 hours it improved to >90%. Gas production also increased in thermophilic range. During start up of the trial initially membrane flux was set at 5.0 lmh but after stabilizing the system flux was increased to 12.5 lmh. Also, increase in membrane flux increased the COD loading to the anaerobic bioreactor. COD loading increased from 1.0 to 7.0 Kg·COD/$m^3$·day as shown in FIG. 10A.

Figure 10B:
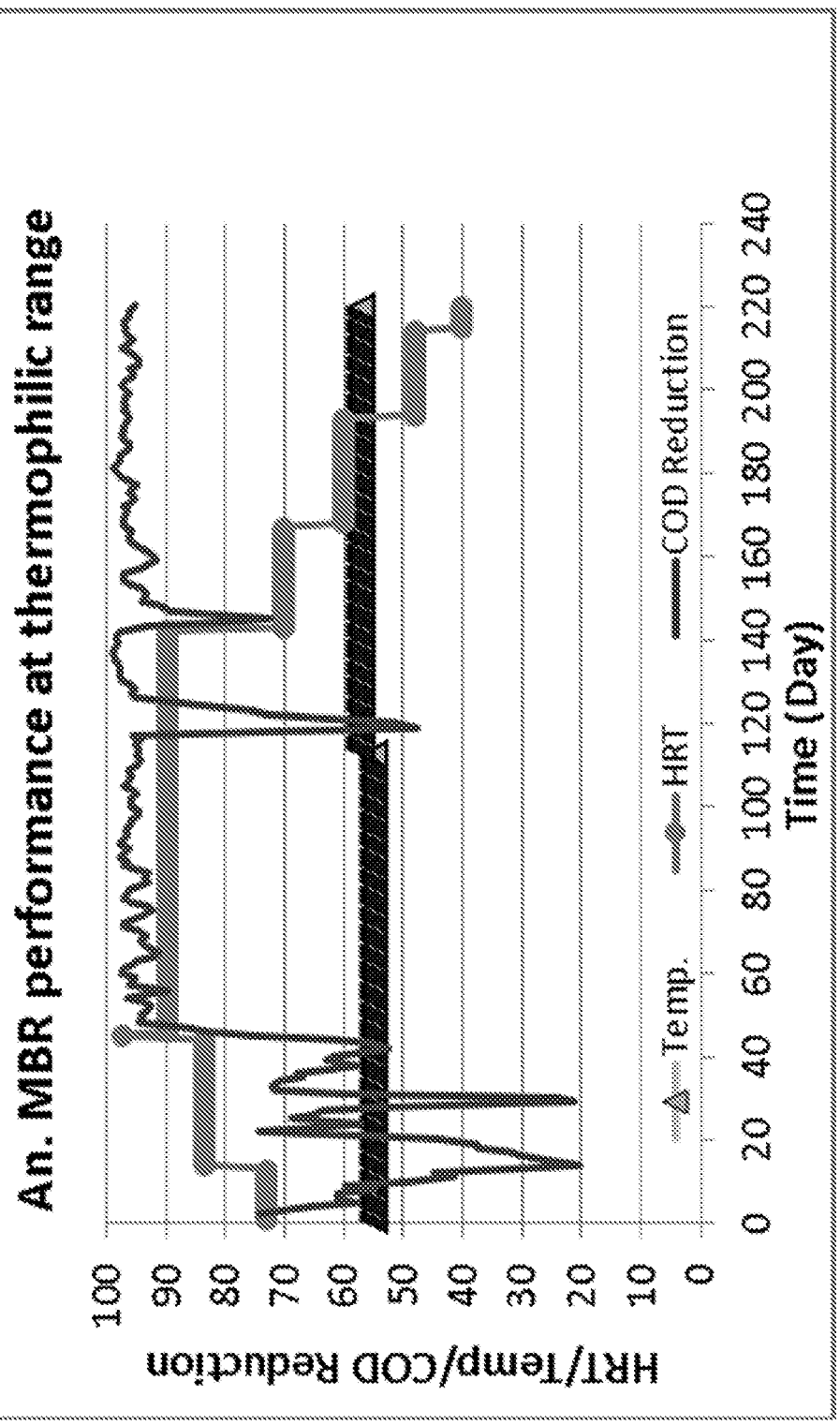
FIG. 10B shows operation of Example 4 at a thermophilic temperature.

FIG. 10B shows the result obtained while operation of biological system at thermophilic range of temperature. After stabilizing the reactor two points, where COD reduction drop down can be seen in FIG. 10B. The first drop is at 118 day of operation at which temperature of reactor was increased to 57° C. from 55° C. Immediate drop in COD reduction shows sensitivity of the process towards small change in temperature.

As the bacterial culture acclimatized with time to the changed conditions the performance was stabilized once again. Second drop in COD reduction happened when HRT of reactor suddenly decreased to 70 hr. from 90 hr. This change also temporarily impacted the reactor performance which subsequently with gradual drop of HRT up to 40 hours showed no loss of performance and COD reduction maintained at >95%.

Mass balance of the An. MBR studied at thermophilic condition was studied. It shows 94% Methanogenesis, and gas generation is 0.38 m3/Kg. COD. Table-7 provides data of mass balance.

TABLE 7

| Parameters | Unit | Value |
| --- | --- | --- |
| Average gas generation per Kg of COD | $M^3$/Kg/day | 0.38 |
| % Hydrolysis | % | 94.00 |
| % Acidification | % | 96.00 |
| % Methanogenesis | % | 94.00 |

Example-5

The present invention discloses the application of ceramic membrane in separation of sludge and water from the highly suspended biological mixture. It also discloses method of physical and chemical cleaning of ceramic membrane to regain flux in fouled condition. Details of the ceramic membrane character are described in Table-8.

TABLE 8

| Parameters | Specification | Unit | Value |
| --- | --- | --- | --- |
| Membrane type | Ceramic | — | — |
| Brand | CeraQ | — | — |
| Supplier | QUA | — | — |
| Housing | Steel | — | — |
| Operating mode | Cross flow | — | — |
| Membrane area | — | $m^2$ | 0.11 |
| Internal diameter of tube | — | mm | 3.6 |
| Operating pressure | — | psi | 10-60 |
| Operating temperature | — | degC. | 110 |
| pH tolerance | — | — | 2-11 |

Figure 11:
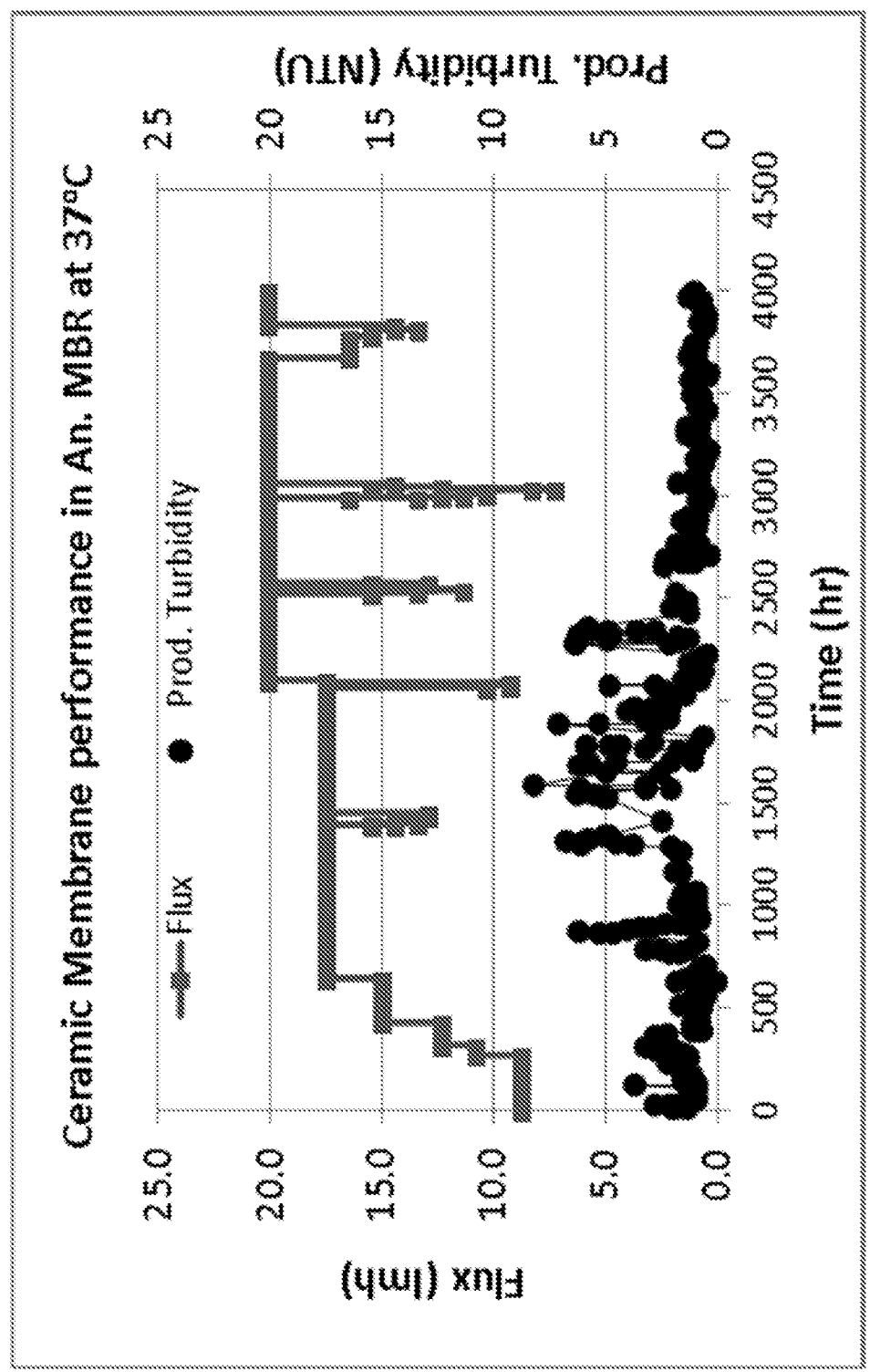
FIG. 11 shows membrane flux and turbidity in Example 5.

Ceramic membrane module operated at wide range of flux from 5 to 20 lmh. Maintaining the flux of 20 lmh did not give any problem throughout the operation. Total solid rejection observed and product water turbidity was <5 NTU for maximum operating hours. Physical cleaning of membrane was performed by applying back pressure from the permeate side of the membrane. Backwash was applied in ceramic membrane after time interval of 5 to 120 min and more specifically after 10 to 40 min. The back pressure applied was 20 to 60 psi. FIG. 11 shows the plot of membrane flux and product turbidity.

Figure 12:
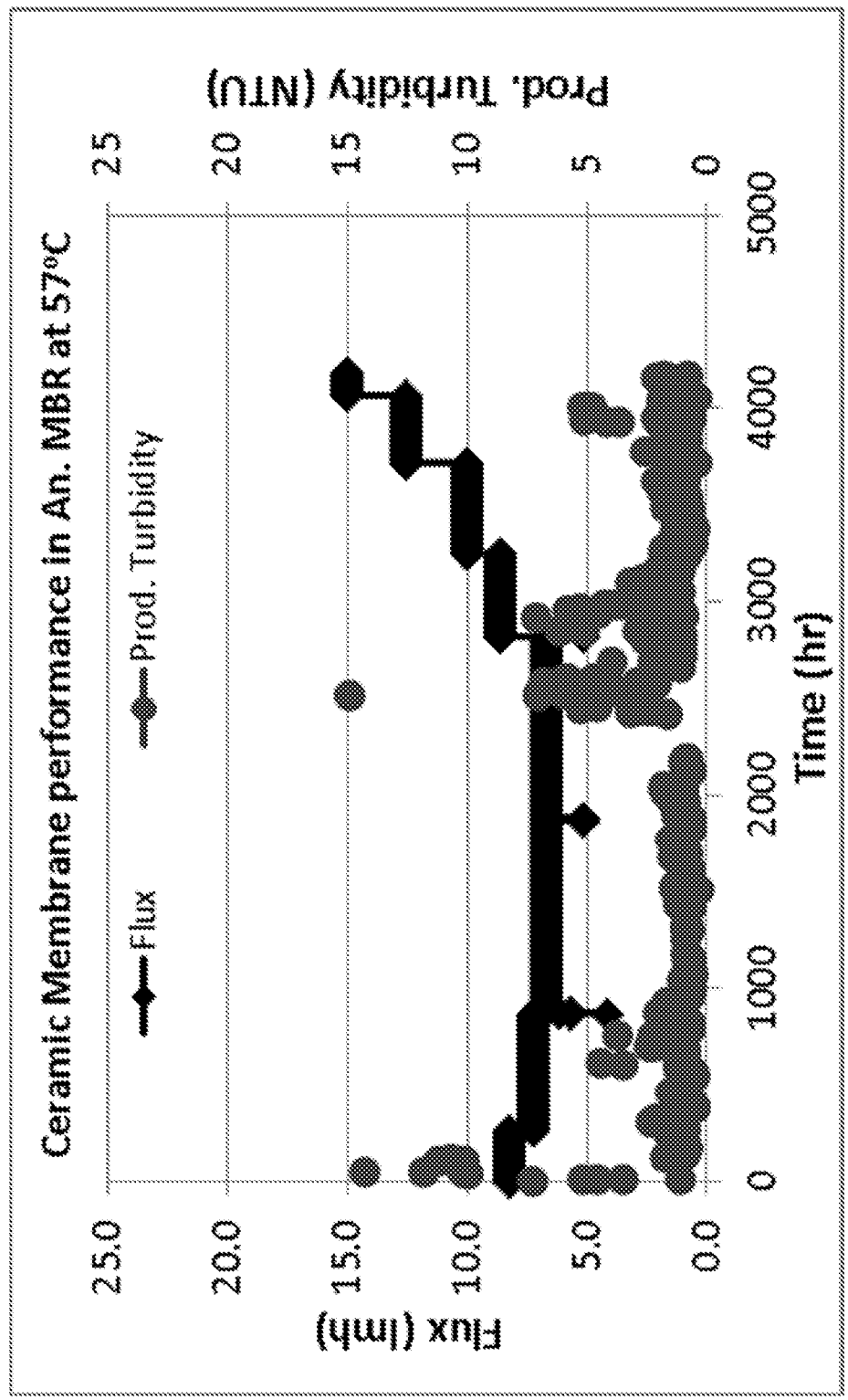
FIG. 12 shows ceramic membrane performance at thermophilic conditions.

The same ceramic membrane was also used during testing of anaerobic bioreactor in thermophilic range. As ceramic membrane has ability to withstand high temperature range at thermophilic condition also it performed well in terms of solid rejection and consistent permeability. FIG. 12 shows ceramic membrane performance at thermophilic conditions.

During operation of ceramic membrane in both temperature range membrane was cleaned with chemicals when flux was regained with simple permeate water backwash. Chemical cleaning was performed after 100 to 1000 hours of filtration cycle. Hypochlorite and citric acid chemical cleaning was used for cleaning the membrane in this process. Both chemicals were circulated through the ceramic membrane module separately and also given a soaking period. Hypochlorite concentration used in chemical cleaning was from 100 ppm to 2000 ppm as chlorine and it was socked for 0.5 hour to 5.0 hours. Citric acid concentration applied is 500 ppm to 5000 ppm and socked for 1.0 hour to 10 hours. As shown in FIG. 11 and FIG. 12, membrane flux recovers after chemical cleaning.

Example 6

Post treatment of the An.MBR product was applied using micro bio fuel (MFC) process to bring COD of anaerobic product in the discharge limit.

In one of the embodiment of present invention average feed COD for anaerobic system was 13000 mg/lit and anaerobic system produced average COD 500 mg/lit at the outlet. When this COD entered to MFC system COD reduction was observed to be more than 50% reducing to <250 mg/lit. COD results from MFC is shown in Table-9

TABLE 9

| An. MBR Feed COD Mg/lit | An. MBR product/ MFC feed COD Mg/lit | MFC Product COD Mg/lit | COD Rejection through MFC % |
| --- | --- | --- | --- |
| 13600 | 560 | 520 | 7.14 |
| 10000 | 540 | 480 | 11.11 |

TABLE 9-continued

| An. MBR Feed COD Mg/lit | An. MBR product/ MFC feed COD Mg/lit | MFC Product COD Mg/lit | COD Rejection through MFC % |
|---|---|---|---|
| 13200 | 700 | 590 | 15.71 |
| 13600 | 360 | 280 | 22.22 |
| 13200 | 410 | 210 | 48.78 |
| 12000 | 370 | 200 | 45.95 |
| 13200 | 550 | 250 | 54.55 |

Initially less COD reduction observed from the WC unit. Once active biofilm formed over the electrode surface COD reduction improved and start to generate effluent having COD within discharge norms.

CONCLUSION

Embodiments show novel applications of ceramic membranes in anaerobic MBR processes. Anaerobic treatment, used in treatment of high COD strength wastewater, when combined with ceramic membranes gives highly consistent results. Ceramic membranes can be applied in wide ranges of temperature and pH. During trial with different type of wastewater ceramic membranes produced consistent product quality irrespective of change in sludge character. Anaerobic processes tested with different types of water and temperature showed consistent results in terms of COD reduction and gas generation. In terms of gas generation, thermophilic conditions show higher conversion rates than mesophilic conditions, which is an added advantage of thermophilic range operation. We also report that An. MBR is a highly sensitive process in terms of temperature control and other process parameters. The present invention also describes a posttreatment method used for An. MBR product water. It is possible to treat product of An MBR process by a novel method using a microbial fuel cell. In post treatment about 50% COD reduction was observed in An. MBR product water treated through WC. Low cost post treatment brought effluent of An. MBR to expected levels for discharge and reuse.

We claim:

1. A method of treating waste water including biodegradable compounds, comprising:
    feeding wastewater to an anaerobic reactor;
    operating the anaerobic reactor at a substantially constant temperature range to produce a mixed liquor including suspended solids and wastewater, wherein said anaerobic reactor includes a diffuser operating above a liquid level in the reactor;
    feeding the mixed liquor to at least one ceramic membrane to separate suspended solids and wastewater, thereby producing a purified water stream; and
    cleaning the ceramic membrane using a back pulse to retain flux at the substantially constant temperature range;
    wherein the substantially constant temperature range is selected from the group consisting of between 20° C. and 45° C.; between 36° C. and 38° C.; and between 56° C. and 58° C.

2. The method of claim 1, further comprising continuously stirring the anaerobic reactor during the step of feeding wastewater.

3. The method of claim 2, wherein the continuous stirring is conducted through a hydraulic mixer.

4. The method of claim 3, wherein a hydraulic mixer nozzle accommodates a high velocity of up to 14 m/sec.

5. The method of claim 1, wherein the substantially constant temperature range is between 20° C. and 45° C.

6. The method of claim 5, wherein the substantially constant temperature range is between 36° C. and 38° C.

7. The method of claim 1, wherein the substantially constant temperature range is between 56° C. and 58° C.

8. The method of claim 1, wherein the at least one ceramic membrane is selected from the group consisting of an ultrafiltration ceramic membrane and a microfiltration ceramic membrane.

9. The method of claim 1, wherein the ceramic membrane is operated at a cross flow velocity of 1.5-4.0 m/sec.

10. The method of claim 1, wherein the ceramic membrane is operated at flux between 15 to 100 lmh.

11. The method of claim 1, further comprising chemical cleaning the ceramic membrane by circulating a solution of sodium hypochlorite, sodium hydroxide, hydrochloric acid and citric acid through the ceramic membrane.

12. An apparatus carrying out the method of claim 1.

13. A method of treating waste water including biodegradable compounds, comprising:
    feeding wastewater to an anaerobic reactor;
    operating the anaerobic reactor at a substantially constant temperature range to produce a mixed liquor including suspended solids and wastewater, wherein said anaerobic reactor includes a diffuser operating above a liquid level in the reactor;
    feeding the mixed liquor to at least one ceramic membrane to separate suspended solids and wastewater, thereby producing a purified water stream;
    sending the purified water stream to a microbial fuel cell for polishing, wherein the microbial fuel cell comprises graphite anodes and cathodes and a heterogeneous cation exchange membrane;
    and cleaning the ceramic membrane with back pulsing at a substantially constant temperature range.

* * * * *